(12) United States Patent
Gray et al.

(10) Patent No.: US 7,895,562 B2
(45) Date of Patent: Feb. 22, 2011

(54) ADAPTIVE WEIGHTING METHOD FOR LAYOUT OPTIMIZATION WITH MULTIPLE PRIORITIES

(75) Inventors: Michael S. Gray, Fairfax, VT (US); Matthew T. Guzowski, Essex, VT (US); Kevin W. McCullen, Essex Junction, VT (US); Xiaoping Tang, Elmsford, NY (US); Robert F. Walker, St. Geroge, VT (US); Xin Yuan, Williston, VT (US)

(73) Assignee: International Business Machines Corporation, Armonk, NY (US)

( * ) Notice: Subject to any disclaimer, the term of this patent is extended or adjusted under 35 U.S.C. 154(b) by 508 days.

(21) Appl. No.: 11/958,606

(22) Filed: Dec. 18, 2007

(65) Prior Publication Data

US 2009/0158223 A1    Jun. 18, 2009

(51) Int. Cl.
*G06F 17/50*    (2006.01)

(52) U.S. Cl. ................. 716/132; 716/133; 716/134; 716/135

(58) Field of Classification Search ............... 716/2, 716/5, 6
See application file for complete search history.

(56) References Cited

U.S. PATENT DOCUMENTS

| 6,189,132 B1 | 2/2001 | Heng et al. | |
| 7,454,721 B2 * | 11/2008 | Hibbeler et al. | 716/2 |
| 7,487,479 B1 * | 2/2009 | Malik et al. | 716/5 |
| 2006/0036561 A1 * | 2/2006 | Aladahalli et al. | 706/48 |

* cited by examiner

*Primary Examiner*—Vuthe Siek
(74) *Attorney, Agent, or Firm*—Gibb I.P. Law Firm, LLC; Richard M. Kotulak, Esq.

(57) ABSTRACT

An adaptive weighting method for layout optimization differentiates different priorities by assigning the weight of a higher priority ($p_i$) to be multiple of the weight of a lower priority ($p_{i-1}$) where $W(p_i) = m_i \% W(p_{i-1})$. To avoid numerical imprecision, this method keeps the total cost in the objective function within a trustable range by scaling the initial weights in the objectives, while maintaining relativity, to produce the scaled weights.

6 Claims, 2 Drawing Sheets

ADAPTIVE WEIGHTING METHOD FOR LAYOUT OPTIMIZATION WITH MULTIPLE PRIORITIES

BACKGROUND

1. Field of the Invention

This invention relates generally to circuit layout optimization and more specifically to differentiating priorities in layout optimization such that priority relativity and numerical precision are maintained at the same time.

2. Description of the Related Art

Automatic layout optimization is a powerful technique to modify a layout for design rule correctness purposes, to optimize a layout for certain objectives such as manufacturability improvement and performance tuning, and to migrate a layout from one technology to another technology.

Usually an LP (linear programming) problem is constructed in a layout optimization tool where variables represent edge locations and/or transform (cell reference) locations. FIG. 1 illustrates a spacing constraint between two edges, x1 and x2. In a hierarchical layout, the actual location of shape edge x1 is $$t1_1 \pm t1_2 \pm \ldots \pm t1_m \pm x1$$

Either "+" or "−" is used depending on the cell orientation.

Similarly, the actual location of shape edge x2 is $$t2_1 \pm t2_2 \pm \ldots \pm t2_n \pm x2$$

The spacing constraint between the two edges shown is $$d\_max \geq (t2_1 \pm t2_2 \pm \ldots \pm t2_n \pm x2) - (t1_1 \pm t1_2 \pm \ldots \pm t1_m \pm x1) \geq d\_min$$

The objective is to fix violations including DRC (design rule checking) violations and DFM (design for manufacturability) violations, specified by a set of DRC rules and a set of recommended rules respectively.

Embodiments herein fix violations and minimize the perturbation of the existing layout at the same time. The minimum layout perturbation-based legalization technique is described in U.S. Pat. No. 6,189,132 "Design rule correction system and method", the complete disclosure of which is hereby incorporated by reference. Layout perturbation includes:

1. location perturbation (locPert): $\min|x - x^{old}|$
2. space perturbation (spacePert): $\min|(x_2 - x_1) - (x_2^{old} - x_1^{old})|$ In the minimum layout perturbation-based legalization technique, the objective is to minimize the total cost:

$$\min(C(\text{layout perturbations}) + C(\text{DFM violations}) + C(\text{DRC violations}))$$

where $C(x)$ means the cost function. The objective function is a linear function. The absolute function for the layout perturbation cost can be linearized using the technique described in U.S. Pat. No. 6,189,132. The cost of moving an edge is set to be the length of the edge. The initial cost of layout perturbation is zero, since there is no perturbation initially. The cost of a DRC or DFM violation needs to be determined such that it can overcome the cost of the edge movement involved in order to fix the DRC/DFM violation. Therefore in the worst case, if all the edges in a layout need to be moved in order to fix a violation, the cost of the violation will have to be larger than the sum of all the location perturbation costs. However, typically in practice, the cost of a violation does not need to be as large as the sum of all location perturbation costs.

SUMMARY

Embodiments herein comprise an adaptive weighting method for layout optimization to handle a list of priorities and avoid numerical imprecision simultaneously. Thus the method can be used in layout migration to migrate a large-scale circuit and used in DFM optimization to handle a dynamic number of priorities (e.g., different sets of recommended rules and DRC rules).

More specifically, to differentiate different priorities of objectives (e.g., to differentiate spacePert from locPert), the embodiments herein assign the weight of a higher priority ($p_i$) to be a multiple of the weight of a lower priority ($p_{i-1}$) where $w(p_i) = m_i w(p_{i-1})$. To avoid numerical imprecision, the embodiments herein keep the total cost in the objective function within a trustable range. In order to keep the total cost within the trustable range, the embodiments herein present a logarithmic-scaling function to scale down the locPert weights and a linear-scaling function to scale down the multipliers as needed. On the other hand, when the total cost is far less than the upper bound, the multipliers can be scaled up to further differentiate different priorities if desired as long as the total cost is within the trustable range.

These and other aspects of the embodiments of the invention will be better appreciated and understood when considered in conjunction with the following description and the accompanying drawings. It should be understood, however, that the following descriptions, while indicating preferred embodiments of the invention and numerous specific details thereof, are given by way of illustration and not of limitation. Many changes and modifications may be made within the scope of the embodiments of the invention without departing from the spirit thereof, and the embodiments of the invention include all such modifications.

BRIEF DESCRIPTION OF THE DRAWINGS

The embodiments of the invention will be better understood from the following detailed description with reference to the drawings, in which.

DETAILED DESCRIPTION

Figure 1:
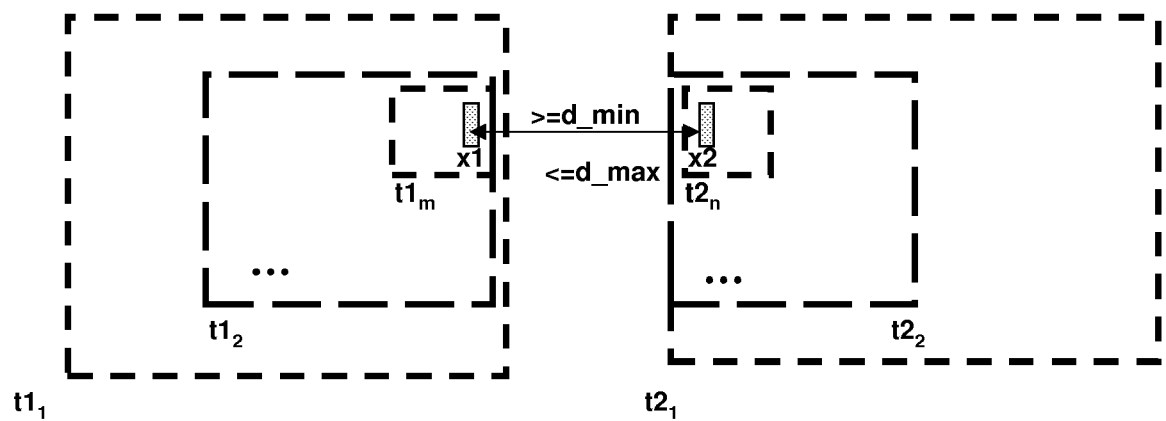
FIG. 1 illustrates a schematic diagram of a spacing constraint.

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments of the invention may be practiced and to further enable those of skill in the art to practice the embodiments of the invention. Accordingly, the examples should not be construed as limiting the scope of the embodiments of the invention.

A layout optimization tool may encounter the following challenges. The first such limitation is the limitation of numerical precision. As the circuit layouts to be optimized get larger and more complicated, the cost in the optimization objective gets so big that it encounters the limitation of numerical precision. It is common that a double-precision floating point number (denoted as "double") is used to represent the cost value. A double uses 64 bits, of which 52 bits are used for fractional number 0.64 bits represent approximately 1.8e19 ($2^{64}$) different numbers and 52 bits represent 4.5e15 different fractional numbers. In a double representation, 1+1e16=1e16. In existing layout optimization tools where integer numbers are used to represent costs, the total cost is much more than 1e16 for a large-scale circuit layout. Therefore, numerical precision cannot be guaranteed for a large-scale layout optimization problem, and unexpected behavior may occur. For example, edges may be moved when there is no need for such movement, and edges may not move when there are objectives to move them in the cost function.

The second such limitation is the inability to handle a dynamic number of priorities with varying granularity. In DFM optimization, there is a list of priorities for the objectives: minimizing location perturbation (locPert), minimizing space perturbation (spacePert), satisfying a set of recommended rules (further classified in terms of priority as: $nv_1, \ldots, nv_k$), and satisfying a set of DRC rules (further classified in terms of priority as: $v_1, \ldots, v_m$). The existing method does not handle all priorities, and is not effective at handling subsets of the priorities.

Figure 2:
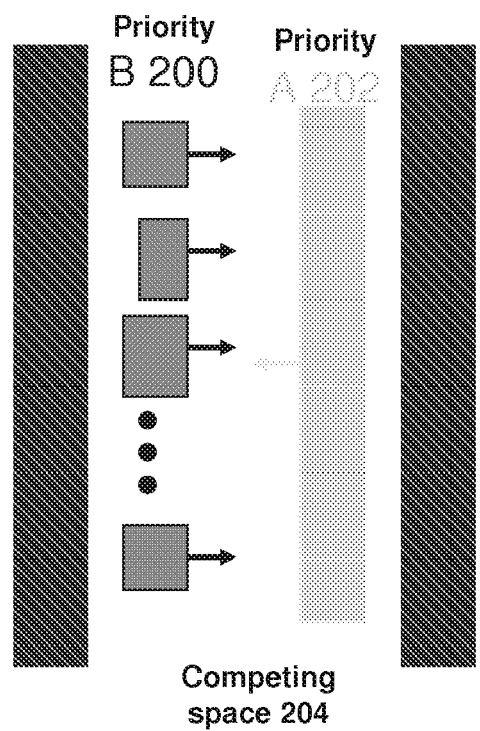
FIG. 2 is a schematic diagram of competing priorities.

As illustrated in FIG. 2, two groups of objects, belonging to priority A (202) and priority B (200) respectively, compete for the space in the middle (204). Assuming priority A is higher than priority B, the weight of priority A should be more than the weight of priority B. If the weight difference is too small, the object in priority A may not win the space. On the other hand, if the weight difference is too big, it may encounter the problem of numerical precision limitation. The total cost is unknown until the problem has been constructed since the total cost is dependant on the problem size, the number of priorities and the number of violations. Usually the differentiation between priorities is a tradeoff multiplier (for example, a multiplier of 100 represents fixing 1 objective from priority #1 over 100 from priority #2). These problems will also happen in other layout optimization tools such as layout compaction tool when multiple priorities are taken into account in optimization.

To solve these problems, the embodiments herein propose an adaptive weighting method for layout optimization with multiple priorities. The method can handle a dynamic number of priorities by differentiating the weights for different priorities while maintaining the numerical precision by dynamically controlling the total cost within a trustable range, referred as [L, R] in the rest of this description, where L is the "left" or "lower" limit of the range and R is the "right" or "upper" limit of the range (e.g., L=0, R=1e15 if integers are used).

Presented in this disclosure is an adaptive weighting method for layout optimization to handle a list of priorities and avoid numerical imprecision simultaneously. One method of adaptive weighting for layout optimization with multiple priorities comprises:

setting initial minimum perturbation weights;

receiving, as input, priorities and trade offs between said priorities;

calculating objective weights based on said priorities and said trade offs;

modifying said objective weights to bias objectives having a same priority;

calculating an initial total objective cost based on said priorities, said trade offs and said minimum perturbation weights and said objective weights;

scaling said initial weights to maintain subsequent total objective costs in a numeric range, while maintaining relativity to produce scaled perturbation weights and scaled objective weights;

solving said layout optimization using said scaled weights to produce a result; and outputting said result.

The total cost in the objective function is: Total_cost=C(location perturbations)+C(space perturbations)+C(DFM violations)+C(DRC violations)

As pointed out before, to avoid numerical precision overflow, there should be an upper bound (which is the upper bound of the trustable range, R) for the total cost, assuming all costs/weights are integers. For the large-scale layout migration problem or the DFM optimization with a list of priorities, the total cost may be more than the upper bound in the existing layout optimization tool. In the existing layout optimization tool, the cost/weight of a location perturbation for a shape edge is the length of the shape edge, which is unnecessarily large for the long wire shapes. As a result, the embodiments herein can adjust the cost/weight of location perturbations dynamically to meet the upper bound constraint.

On the other hand, the embodiments herein may have a dynamic number of priorities to handle in the layout optimization, such as, location perturbation, space perturbation, satisfying a set of recommended rules (further classified in terms of priority as: $nv_1, \ldots, nv_k$), and satisfying a set of DRC rules (further classified in terms of priority as: $v_1, \ldots, v_m$). The number of priorities is known only after processing the input layout. However, location perturbation always exists in the priority list. Space perturbation may not appear in the layout input. There may be no DFM violations, and thus k=0. There may be no DRC violations, and thus m=0.

The priority order is given as:

Location perturbation<space perturbation<$nv_1$<$nv_2$<...<$nv_k$<$v_1$<$v_2$<...<$v_m$ Sort all appearing priorities in a list of increasing order: $p_0, p_1, p_2, \ldots, p_q$.

Since location perturbation already appears and is the lowest priority, $p_0$ is location perturbation.

Within every priority class, $p_i$, there is a set of elements (treated as variables), $e_{ij}, j=1, 2, \ldots e_{ij}$ belonging to $p_i$.

Denote as: $p_i = \{e_{ij} | j=1, 2, \ldots\}$ and $e_{ij} \chi p_i$.

Then the cost $C(p_i) = \Sigma C(e_{ij})$

Every $C(e_{ij})$ is a linear function: $C(e_{ij}) = W(e_{ij}) \% e_{ij}$, where $W(e_{ij})$ is called weight of the element $e_{ij}$. Without confusion, the embodiments herein also use $W_{ij}$ to denote $W(e_{ij})$.

The total cost:

Total_cost=C(location perturbations)+C(space perturbations)+C(DFM violations)+C(DRC violations)= $\Sigma C(p_i) = \Sigma\Sigma C(e_{ij}) = \Sigma\Sigma W_{ij} \% e_{ij}$ The embodiments herein use a tradeoff multiplier to differentiate priorities:

$W(e_{i,j}) = m_i \% W(e_{i-1,j'})$ where $m_i$ is the multiplier between the adjacent priorities, $e_{i,j} \chi p_i$, and $e_{i-1,j'} \chi p_{i-1}$. The weights of location perturbation ($p_0$), $W(e_{0j})$, are determined based on the input layout. Then the other weights, $W(e_{ij})$, i>0, are determined using the formula.

To maintain the differentiation at a certain fixed level, the embodiments herein enforce that $m_i$ has a lower bound value (e.g., 10). Therefore, the embodiments herein can compute the total cost, and adjust the multipliers adaptively to meet the upper bound constraint for the total cost.

Since the embodiments herein have four categories of priorities: location perturbations, space perturbations, DFM violations, and DRC violations, the embodiments herein may want to maintain a certain amount of differentiation between categories. For this reason, the embodiments herein can define $s_1$, $s_2$, and $s_3$ to replace the corresponding $m_i$.

$s_1$ is the multiplier between the space perturbation and the location perturbation;

$s_2$ is the multiplier between the first priority in DFM violations and its predecessor (the predecessor may not be space perturbation necessarily. It can be location perturbation if space perturbation does not appear);

$s_3$ is the multiplier between the first priority in DRC violations and its predecessor.

In other words, $s_1$, $s_2$, and $s_3$ can not be scaled down, but can be scaled up. For instance, the embodiments herein can set $s_1=100$, $s_2=100$, $s_3=10000$.

In one case, even if two elements, $e_{ij}\chi p_i$, $e_{ij'}\chi p_i$, belong to the same priority $p_i$, the costs may be different (to differentiate the two elements), i.e., $$W(e_{ij})=W(e_{ij'})+\text{Oð},\ \text{Oð}\gamma 0$$

Oð is called objective delta. The embodiments herein need to adjust the objective delta adaptively according to its priority order.

In another case, one element may appear several times in a hierarchical layout (some cell may be instantiated and placed several times in a hierarchical layout). The number of times that the element appears is called count. In some applications such as DFM optimization, the count needs to be considered into the objective cost, while in other applications such as DRC, the count does not need to be considered. When the count is considered, the embodiments herein may need to adjust the count adaptively as well according to the element's priority order.

Figure 3:
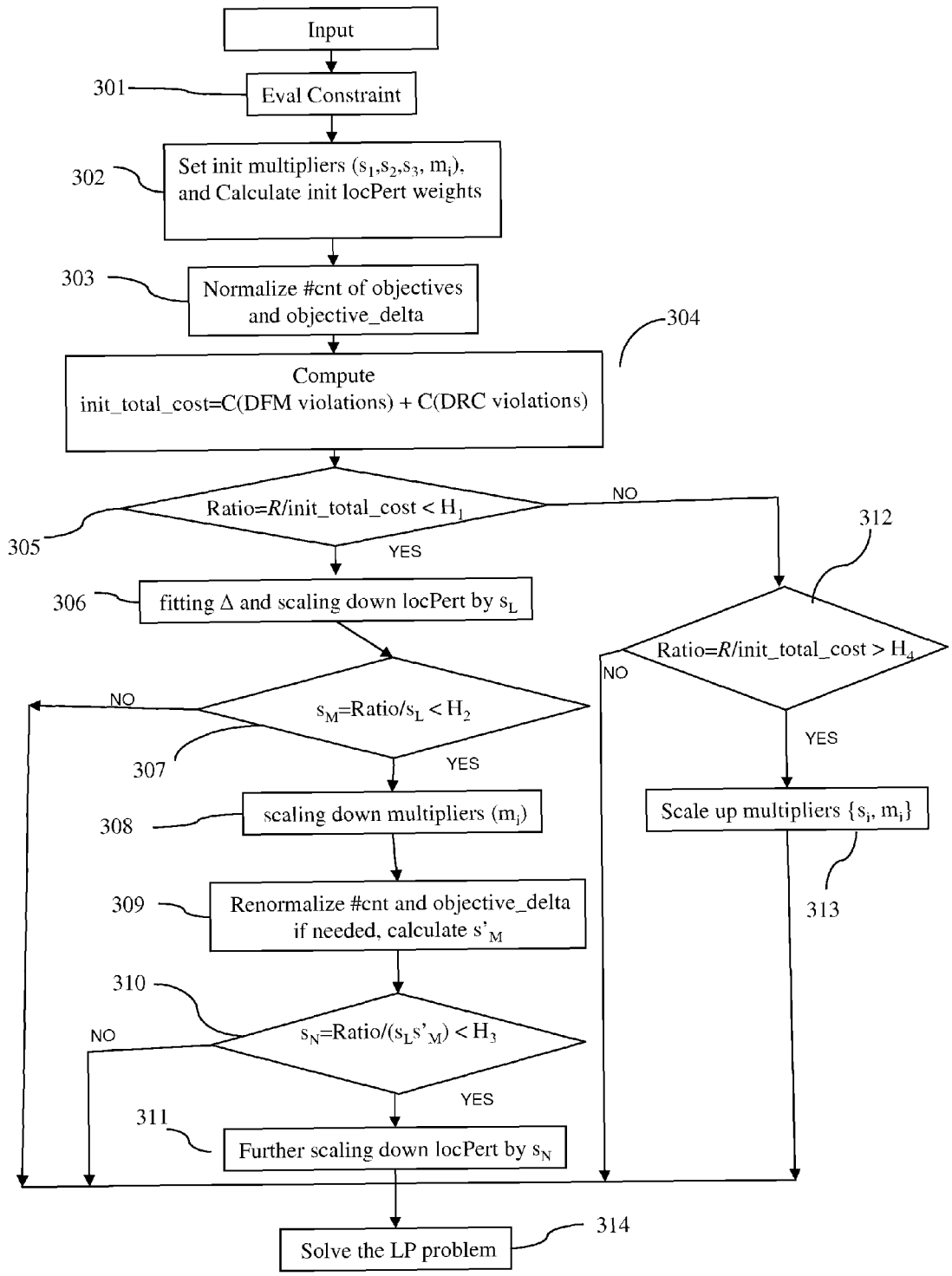
FIG. 3 is a flow diagram illustrating a preferred method of an embodiment of the invention.

FIG. 3 illustrates the flow chart of the method. The steps in the flow chart are described in detail as follows:

Item 301 is shown as the EvalConstaint step. In item 301, the input layout is read in and processed. After the processing, the number of priorities is known, such as, location perturbation, space perturbation, $nv_1, nv_2, \ldots, nv_k, v_1, v_2, \ldots, v_m$. All appearing priorities are sorted in increasing order to a list: $p_0$, $p_1$, $p_q$. As pointed out above, $p_0$=location perturbation.

Item 302 is shown as the Set init multipliers ($s_1$, $s_2$, $s_3$, $m_i$) and calculate init locPert weights step. In item 302, the initial multipliers are assigned with values, for example, $s_1=100$, $s_2=100$, $s_3=10000$, $m_i=100$. The values can be specified by users' input. Because the embodiments herein maintain the greatest differentiation between DRC violation and other categories, the values of $s_1$, $s_2$, $m_i$ should be much less than $s_3$ in this case.

Then the initial costs for location perturbation are calculated. For example, the initial weight of location perturbation for each shape edge ($W(e_{0j})$, $e_{0j}\chi p_0$) is equal to the length of the edge. The initial weight of location perturbation for each cell instance ($W(e_{0j})$, $e_{0j}\chi p_0$) is assigned as the sum of the location perturbation weights of all the shapes in it.

Item 303 is shown as the Normalize count and objective_delta step. In item 303, some cells may be instantiated and placed several times in a hierarchical layout. Therefore some element, $e_{ij}\chi p_i$, may appear several times. When the count is considered, the actual cost of moving an element is $$\text{count} \% C(e_{ij})$$

Since the cost for moving the element in the next priority, $e_{i+1,j'}\chi p_{i+1}$, is $$m_i \% C(e_{ij})$$

If count>$m_i$, then count % $C(e_{ij})$>$m_i$ % $C(e_{ij})$, i.e., the cost of moving the element is more than the one belonging to the higher priority, which is not preferable in some case. For this reason, the count can be normalized to the integers between 1 and $m_i-1$. One way to normalize the count is to use a logarithmic-scaling function:

$$\text{norm\_count}=1+b \% \log(\text{original count})$$

where b is the parameter of the logarithmic-scaling function.

Since the maximum of original count is mapped to $m_i-1$, thus $$b=(m_i-2)/\log(\text{maximum of original count})$$

Then after normalization, the actual cost is $$\text{norm\_count} \% C(e_{ij})$$

In some cases, an element, $e_{ij}\chi p_i$, may have a cost addition, Oð (called objective delta), to differentiate the elements that belong to the same priority $p_i$. The embodiments herein define a base weight for each priority, $W(p_i)$:

$$W(p_0)=\text{maximum of } W(e_{0j}), e_{0j}\chi p_0$$

$$W(p_i)=m_i \% W(p_{i-1})$$

Thus, if there is no objective delta, then the weight of an element is actually the base weight of its priority, i.e., $$W(e_{ij})=W(p_i), e_{ij}\chi p_i, i\gamma 0$$

When there is an objective delta, Oð, the weight of an element can be:

$$W(e_{ij})=W(p_i)+\text{Oð}e_{ij}\chi p_i, i\gamma 0$$

If the Oð is too small, it may not be differentiable. On the other hand, if the Oð is too big, the weight of the element may even be bigger than the element in the higher priority. In the case where Oð is normalized, the following method can be used.

Assume that Oð is in the range of [lb, hb]. Oð' denotes the normalized Oð. Then the weight of an element, $e_{ij}$, can be:

$$W(e_{ij})=W(p_i)+\text{Oð}' \% W(p_{i-1})=(m_i+\text{Oð}') \% W(p_{i-1}),$$
$$e_{ij}\chi p_i, i\gamma 0$$

Let Oð' be in the range of [1, $m_i-1$]. The embodiments herein use a linear function to normalize Oð to Oð':

$$\text{Oð}'=1+b \% (\text{Oð}-lb)$$

where b is a parameter of the linear function.

$$b=(m_i-2)/(hb-lb)$$

If both count and Oð happen at the same time, the actual cost of moving an element, $e_{ij}$, will be:

$$\text{norm\_count} \% C(e_{ij})=\text{norm\_count} \% (m_i+\text{Oð}') \% W(p_{i-1}) \% e_{ij}$$

Thus the equivalent weight when considering count is $$\text{norm\_count} \% (m_i+\text{Oð}') \% W(p_{i-1})$$

The base weight of the next priority, $p_{i+1}$, is:

$$m_{i+1} \% W(p_i)=m_{i+1} \% m_i \% W(p_{i-1})$$

Thus it is possible that the equivalent weight of $e_{ij}$ is more than the base weight of $p_{i+1}$. If this situation is to be avoided, then the embodiments herein can normalize count to the range of $[1, m_i/2]$.

Item 304 is shown as the Compute initial total cost step. In item 304, for the given layout, the initial cost for location perturbation and space perturbation is zero as nothing has changed ($e_{ij}=0$ initially for location perturbation and space perturbation). Then the initial total cost:

init_total_cost=C(DFM violations)+C(DRC violations)

Because the costs are minimized in solving the linear programming problems, the init_total_cost is actually the upper bound of all the costs. Thus if the init_total_cost is less than R, all the costs will be in the trustable range.

As shown in decision box 305, if the init_total_cost is more than the upper bound R, the embodiments herein will first try to scale down the weights of elements in location perturbation ($p_0$). Because all of the other weights in other priorities are calculated as the multiples of the maximum location perturbation weight, they will be scaled down proportionally. Then the init_total_cost will be scaled down proportionally. If the scaling-down of weights is not enough, the embodiments herein then try to scale down the multipliers to meet the upper bound constraint for the total cost.

On the other hand, if the init_total_cost is much less than R, the embodiments herein can scale up the multipliers to further differentiate the priorities, if further differentiate different priorities is desired, as long as the upper bound constraint is still satisfied.

Item 306 is shown as Fitting $\Delta$ and scaling down location perturbation weights steps. In item 306, the init_total_cost is more than R, the embodiments herein scale down the weights. The condition is:

ratio=R/init_total_cost<$H_1$ where $H_1$ is the threshold to trigger scaling down, e.g., $H_1=0.9$ Since the weights in the priorities, $p_i$, i>0, are calculated as the multiples of the maximum location perturbation ($p_0$) weight, all weights will be scaled down if the weights in location perturbation ($p_0$) are scaled down.

This step in the proposed flow will scale down the weights in location perturbation ($p_0$) and meanwhile try to maintain the relativity of the weights. The embodiments herein use a logarithmic-scaling function $w'=1+B \% \log(w)$ where B is the parameter of the logarithmic-scaling function, to map the original weights (w) of location perturbation to the integer numbers (w') in the range of $[1, t]$, where t is called the target of maximum scaled weight.

Maintaining relativity means:

If $w_2 > w_1$, then $w_2' > w_1'$

Since $w_1'$ and $w_2'$ are integers, the embodiments herein have $w_2' - w_1' \geq 1$ It implies:

$(1+B \% \log(w_2)) - (1+B \% \log(w_1)) = B \% \log(w_2/w_1) \geq 1$

The method of scaling down is as follows.

First, all the unique weights for the location perturbation are sorted in the increasing order as $w_1, w_2, \ldots, w_n$ Then, $\Delta_i$ are computed as:

$w_{i+1}/w_i = 1+\Delta_i$ i.e., $\Delta_i = w_{i+1}/w_i - 1$

All $\Delta_i > 0$.

Then, the embodiments herein compute:

$\Delta = \min(\text{median}\{\Delta_i\}, \text{average}\{\Delta_i\})$

The parameter, B, in the logarithmic-scaling function, is assigned as $B = 1/\log(1+\Delta)$ B is assigned such that if any $w_j/w_i \geq 1+\Delta$, then relativity is preserved, i.e., $w_j' > w_i'$. This is because $w_j' - w_i' = (1+B \% \log(w_j)) - (1+B \% \log(w_i)) = B \% \log(w_j/w_i) \geq B \% \log(1+\Delta) = 1$ This implies that if the embodiments herein use $\Delta = \min\{\Delta_i\}$ to derive the logarithmic-scaling function, then all relativity can be preserved after scaling down.

Then the maximum of scaled weights is: $t = 1+B \% \log(\max\{w_i\})$.

Since all weights in $p_i$, i>0 are calculated based on the multiples of the maximum location perturbation weight, the weights in $p_i$, i>0 will be scaled down proportionally by $f_1 = t/\max\{w_i\}$.

The initial cost for the elements in $p_0$ is zero, as location perturbation is zero initially. Thus the initial total cost is scaled down by $f_1$ as well. If the scaled initial total cost is much less than R, then the scaling-down of weights may be more than necessary. For this reason, the embodiments herein can check whether the scaling of factor $f_1$ is more than necessary.

$f_2 = R/\text{scaled\_init\_total\_cost} = R/(\text{init\_total\_cost} \% f_1) = \text{ratio}/f_1$ If $f_2 > H_5$, where $H_5$ is the threshold indicating that scaling-down is more than necessary, e.g., $H_5 = 1.1$), then the embodiments herein adjust the parameter, B, in the logarithmic-scaling function as follows:

$B' = B \% f_2$

Thereafter, the embodiments herein use the logarithmic-scaling function to map all weights in location perturbation ($p_0$) to new weights, and calculate new weights for the elements in other $p_i$, i>0.

$S_L$ denotes the actual scaling factor.

$S_L = \text{scaled\_init\_total\_cost}/\text{init\_total\_cost}$

When there is no adjustment of B, $S_L = f_1$. Otherwise, $S_L = f_1 \% f_2$

Item 308 is shown as the Scaling down multipliers step. In item 308, the embodiments herein have scaled down the weights. When the scaling-down of weights is not sufficient, in this step the embodiments herein will scale down the multipliers.

As shown in decision box 307, the initial total cost has been scaled down by $S_L$ in step 306 above. If $S_M = \text{ratio}/S_L = R/\text{scaled\_init\_total\_cost} < H_2$ where $H_2$ is the threshold indicating that the scaling-down of weights is not sufficient (e.g., $H_2 = 0.9$) then the multipliers are scaled down to reduce the initial total cost by $S_M$.

As pointed out before, the embodiments herein may not want to scale down the inter-category multipliers, i.e., $s_1$, $s_2$ and $s_3$. In this step, the embodiments herein only scale down the intra-category multipliers, i.e., the multipliers between $nv_i$ and $nv_{i+1}$ and between $v_i$ and $v_{i+1}$. One possible way to scale down multipliers is as follows.

Let n be the number of intra-category multipliers, $m_i$, i=1, 2, ..., n. The multipliers are scaled down linearly by a factor of z:

$$m_i' = zm_i$$

Assume in the cost objective, the cost of the highest priority is dominant (this is reasonable because the weights for the highest priority is much more than others).

Thus $$\text{New\_total\_cost} \subset C(p_q) = \Sigma W(e_{qj}) \% e_{qj} \subset \Sigma W(p_q) \%$$
$$e_{qj} = \Sigma m_q' \% \quad W(p_{q-1}) \% \quad e_{qj} = \Sigma z \% m_q \%$$
$$W(p_{q-1}) \% e_{qj} = \ldots = \Sigma z^n \% m_q \% m_{q-1} \% \ldots \%$$
$$m_1 \% W(p_0) \% e_{qj} \subset z^n \% \text{original\_total\_cost}$$

Since the embodiments herein scale down the initial total cost by $S_M$, thus the embodiments herein have $$Z^n = S_M \text{ i.e. } z = \exp(\log(S_M)/n)$$

After the value of z is determined, the multipliers can be scaled down linearly by z. It is possible that n=0, which means that there is no multiplier being scaled down.

Because the embodiments herein maintain a certain amount of differentiation between priorities, $m_i'$ is required to be no less than a certain value, $\eta$, (e.g., 10). In the case where z is too small such that $m_i' = z m_i < \eta$, the embodiments herein may need to adjust z such that $m_i' \geq \eta$. For instance, the default value of $m_i$ is set to be 100, $\eta = 10$, and thus $0.1 \leq z < 1$.

When the cost of the highest priority is not dominant, which can be detected by re-computing the initial total cost, the embodiments herein can adjust the factor z accordingly based on the new initial total cost.

Item 309 is shown as the Renormalize count and objective_delta if needed, and calculate the actual scaling factor: $S_M'$ step. In item 309, if $m_i$ change, the count and the objective_delta, ⊛, may need to be re-normalized since their values are determined based on the values of $m_i$. The re-normalization is similar to Step 303, Normalize count and objective_delta.

After re-normalization, the embodiments herein can re-compute the initial total cost. Therefore, the embodiments herein can calculate the actual scaling factor of the total cost: $S_M'$ by scaling down multipliers. $S_M'$ can be different from $S_M$, because n can be zero or the weights are not scaled down linearly across all priorities.

Item 311 is shown as the Further scaling down location perturbation weights step. In item 311, the embodiments herein have scaled down the weights in Step 306 and scaled down the multipliers in Step 308. The scaling factors are $S_L$ and $S_M'$ respectively. When the scalings are still not sufficient, in this step the embodiments herein will try to further scale down the weights regardless of the relativity of location perturbation weights.

As shown in decision box 310, the initial total cost has been scaled down by $S_L$ in Step 306 and $S_M'$ in Step 308. If $$S_N = \text{ratio}/(S_L S_M') < H_3$$

where $H_3$ is the threshold indicating that the scalings are not enough (e.g., $H_3 = 0.9$), then the weights are further scaled down to reduce the initial total cost by $S_N$.

Again, since the weights in the priorities, $p_i$, i>0, are calculated as the multiples of the maximum location perturbation ($p_0$) weight, all weights will be scaled down if the weights in location perturbation ($p_0$) are scaled down.

The weights in location perturbation have been scaled down in Step 306 by a logarithmic-scaling function. In this step, the embodiments herein can just scale down the weights further by a linear-scaling function. The combined effects are equivalent to scaling down the original weights by a logarithmic-scaling function with smaller scaling factor. This is because:

$$w_2 = 1 + b_1 \% \log(w_1)$$

$$w_3 = 1 + b_2 \% (w_2 - 1)$$

Thus, $w_3 = 1 + b_1 \% b_2 \% \log(w_1)$

Thereafter, the linear-scaling function in this step is derived as:

$$w' = 1 + S_N \% (w - 1)$$

The embodiments herein use the linear-scaling function to map all weights in location perturbation ($p_0$) to new weights, and then scale down the other weights for the elements in $p_i$, i>0.

Item 313 is shown as the Scaling up multipliers step. In item 313, the init_total_cost is much less than R, the embodiments herein try to scale up the multipliers to further differentiate priorities. As shown in decision box 312, the condition is:

$$\text{ratio} = R/\text{init\_total\_cost} > H_4$$

where $H_4$ is the threshold indicating that the init_total_cost is much less than R and scaling up is triggered (e.g, $H_4 = 10$).

Different from scaling down multipliers in Step 308, the embodiments herein may want to scale up both the intra-category multipliers and the inter-category multipliers, i.e., $s_1$, $s_2$ and $s_3$. One possible way to scale up multipliers is as follows.

As the priority list is $p_0, p_1, \ldots, p_q$, there will be q multipliers (including $s_i$) to be scaled up. The multipliers are scaled up linearly by a factor of a:

$$m_i' = a m_i$$

Similar to Step 308, assume in the cost objective, the cost of the highest priority is dominant (this is reasonable because the weights for the highest priority is much more than others).

Thus, $$\text{New\_total\_cost} \subset C(p_q) = \Sigma W(e_{qj}) \% e_{qj} \subset \Sigma W(p_q) \%$$
$$e_{qj} = \Sigma m_q' \% \quad W(p_{q-1}) \% \quad e_{qj} = \Sigma a \% m_q \%$$
$$W(p_{q-1}) \% e_{qj} = \ldots = a^q \% m_q \% m_{q-1} \% \ldots \%$$
$$m_1 \% W(p_0) \% e_{qj} \subset a^q \% \text{original\_total\_cost}$$

Since the embodiments herein scale up the initial total cost by ratio, thus the embodiments herein have $$a^q = \text{ratio i.e. } a = \exp(\log(\text{ratio})/q)$$

After the value of a is determined, the multipliers can be scaled up linearly by a.

Because in this step the multipliers are getting bigger, the range for count and objective_delta are getting bigger as well. The previously normalized values for count and objective_delta are still valid (staying in the range). Thus it is optional to re-normalize count and objective_delta to take advantage of the bigger range.

When the cost of the highest priority is not dominant, which can be detected by re-computing the initial total cost, the embodiments herein can adjust the factor a accordingly based on the new initial total cost.

Item 314 is shown as the Solve the LP problem step. After all the weights and multipliers are determined; the linear programming (LP) problem can be constructed. The total cost will be in the trustable range and the priorities are properly differentiated.

Above is a generalized flow chart for the adaptive weighting method. People with normal skills can modify the flow to satisfy their specific needs, such as omit some steps, re-order some steps, and replace with different parameters and scaling functions, and so on. For example, for a layout compaction tool where there is no layout perturbation, the base weight of $p_0$ is pre-defined or given by user input, then Step 306 and Step 311 can be skipped.

The embodiments of the invention can take the form of an entirely hardware embodiment, an entirely software embodiment or an embodiment including both hardware and software elements. In a preferred embodiment, the invention is implemented in software, which includes but is not limited to firmware, resident software, microcode, etc.

Furthermore, the embodiments of the invention can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments of the invention have been described in terms of preferred embodiments, those skilled in the art will recognize that the embodiments of the invention can be practiced with modification within the spirit and scope of the appended claims.

What is claimed is:

1. A method of adaptive weighting for layout optimization of multiple objectives having priorities, comprising:

setting initial minimum perturbation weights for location perturbation and space perturbation, using a computerized device;

receiving, as input, priorities for said location perturbation, said space perturbation, and rules, and trade offs between said priorities;

calculating objective weights for said location perturbation, said space perturbation, and said rules based on said priorities and said trade offs using said computerized device;

modifying said objective weights to bias objectives of ones of said location perturbation, said space perturbation, and said rules having a same priority using said computerized device;

calculating an initial total objective cost based on said priorities, said trade offs and said minimum perturbation weights and said objective weights using said computerized device;

scaling said initial minimum perturbation weights and said objective weights to maintain subsequent total objective costs in a numeric range, while maintaining relativity, to produce scaled perturbation weights and scaled objective weights using said computerized device;

solving said layout optimization using said scaled perturbation weights and said scaled objective weights to produce a layout optimization using said computerized device; and outputting said layout optimization.

2. The method according to claim 1, wherein said scaling of said initial minimum perturbation weights and objective weights is performed using at least one different scaling method, including linear scaling, logarithmic scaling, and exponential scaling.

3. The method according to claim 1, wherein said scaling is performed so as to maintain a defined amount of differentiation between different priorities.

4. The method according to claim 1, wherein said priorities are within priority classes, and at least one of said priority classes has predefined scaling values.

5. The method according to claim 1, further comprising considering a count, comprising a number of times that an element appears, to determine said subsequent total objective costs, wherein said count is normalized if said number of times that said element appears is greater than one.

6. A method of adaptive weighting for layout optimization of multiple objectives having priorities, comprising:

setting initial minimum perturbation weights for location perturbation and space perturbation, using a computerized device;

receiving, as input, priorities for said location perturbation, said space perturbation, and rules and trade offs between said priorities;

calculating objective weights for said location perturbation, said space perturbation, and said rules based on said priorities and said trade offs using said computerized device;

modifying said objective weights to bias objectives of ones of said location perturbation, said space perturbation, and said rules having a same priority using said computerized device;

calculating an initial total objective cost based on said priorities, said trade offs and said minimum perturbation weights and said objective weights using said computerized device;

scaling said initial minimum perturbation weights and said objective weights to maintain subsequent total objective costs in a numeric range, while maintaining relativity, to produce scaled perturbation weights and scaled objective weights, wherein said scaling comprises assigning a weight of a higher priority to be a multiple of a weight of a lower priority using said computerized device;

solving said layout optimization using said scaled perturbation weights and said scaled objective weights to produce a layout optimization using said computerized device; and outputting said layout optimization.

* * * * *